(12) United States Patent
Patil et al.

(10) Patent No.: US 12,010,131 B2
(45) Date of Patent: Jun. 11, 2024

(54) LINK ANOMALY DETECTOR

(71) Applicant: Panasonic Automotive Systems Company of America, Division of Panasonic Corporation of North America, Peachtree City, GA (US)

(72) Inventors: Nikshep Patil, Peachtree City, GA (US); Satpreet Singh, Fayetteville, GA (US)

(73) Assignee: Panasonic Automotive Systems Company of America, Division of Panasonic Corporation of North America, Peachtree City, GA (US)

(*) Notice: Subject to any disclaimer, the term of this patent is extended or adjusted under 35 U.S.C. 154(b) by 276 days.

(21) Appl. No.: 17/527,960

(22) Filed: Nov. 16, 2021

(65) Prior Publication Data

US 2022/0166787 A1    May 26, 2022

Related U.S. Application Data

(60) Provisional application No. 63/117,819, filed on Nov. 24, 2020.

(51) Int. Cl.
*H04L 9/40* (2022.01)
*G06F 9/54* (2006.01)
*H04L 12/40* (2006.01)
*G06N 20/00* (2019.01)

(52) U.S. Cl.
CPC ............ *H04L 63/1425* (2013.01); *G06F 9/54* (2013.01); *H04L 12/40* (2013.01); *G06N 20/00* (2019.01); *H04L 2012/40215* (2013.01)

(58) Field of Classification Search
CPC .............. H04L 63/029; H04L 63/0236; H04L 63/0272; H04L 61/5014; H04L 61/2514; H04L 61/4511; H04L 63/083
See application file for complete search history.

(56) References Cited

U.S. PATENT DOCUMENTS

| | | | | |
|---|---|---|---|---|
| 11,190,550 B1* | 11/2021 | Wu | ........................ | H04L 63/20 |
| 11,271,972 B1* | 3/2022 | Ravi | .................. | H04L 63/0236 |
| 11,303,647 B1* | 4/2022 | Wu | ....................... | H04L 63/105 |
| 2011/0307217 A1* | 12/2011 | Fritz | ..................... | G01D 21/00 |
| | | | | 702/183 |
| 2012/0278477 A1* | 11/2012 | Terrell | .................... | H04L 69/22 |
| | | | | 709/224 |
| 2016/0381059 A1* | 12/2016 | Galula | .................... | H04L 63/02 |
| | | | | 726/23 |
| 2017/0353477 A1* | 12/2017 | Faigon | ................ | H04L 63/1416 |
| 2019/0356533 A1* | 11/2019 | Vasseur | ................. | G06N 20/00 |

(Continued)

*Primary Examiner* — J. Brant Murphy
(74) *Attorney, Agent, or Firm* — Laurence S. Roach, Esq.

(57) ABSTRACT

Examples of the present disclosure relate to a system, method, and computer-readable medium for link anomaly detection across an inter-processor link in an infotainment system of a vehicle. In an example, the system includes a first processor, a second processor, and an inter-processor link to connect the second processor to the first processor. The system may include an anomalous detector and corrector module (ADCM) located on at least one of the first processor and the second processor, the ADCM to monitor a data exchange over the inter-processor link and initiate a correction action in response to an identification that the data exchange over the inter-processor link is anomalous.

18 Claims, 9 Drawing Sheets

(56) References Cited

U.S. PATENT DOCUMENTS

2020/0389469 A1* 12/2020 Litichever ............... H04W 4/40
2021/0014254 A1*  1/2021 Weber ................. H04L 63/1425
2021/0035116 A1*  2/2021 Berrington ............... G06N 5/04
2022/0345490 A1* 10/2022 Wu ......................... H04L 67/10

* cited by examiner

500

LINK ANOMALY DETECTOR

CROSS-REFERENCED TO RELATED APPLICATIONS

This application claims the benefit of U.S. Provisional Application No. 63/117,819 filed on Nov. 24, 2020, the disclosure of which is hereby incorporated by reference in its entirety for all purposes.

FIELD OF THE INVENTION

The present disclosure generally relates to a method, system, and device to detect anomalies in communication between processors in a vehicle. More specifically, the present disclosure relates to anomaly detection in the IPC link in the infotainment system of a vehicle.

BACKGROUND

This section is intended to introduce the reader to various aspects of art, which may be related to various aspects of the present disclosure, which are described and/or claimed below. This discussion is believed to be helpful in providing the reader with background information to facilitate a better understanding of the various aspects of the present disclosure. Accordingly, it can be understood that these statements are to be read in this light, and not as admissions of prior art.

In a vehicle, an infotainment system or other media display system for displaying media or information can be a multiple microprocessor system. In an example, the two or more microprocessors may include a main microprocessor and a multimedia processor or display specific processor. The two microprocessors can communicate with each other or any number of connected processors through a link. This link connection between processors is known as an inter-processor communication (IPC) link.

SUMMARY

The present techniques relate to a system for anomalous communication detection. The system may be located in a vehicle and include a first processor, a second processor, and an inter-processor link. In an example the inter-processor link may connect the second processor to the first processor. The system may also include an anomalous detector and corrector module (ADCM) located on at least one of the first processor and the second processor. In an example, the ADCM is to monitor a data exchange over the inter-processor link and initiate a correction action in response to an identification that the data exchange over the inter-processor link is anomalous.

The present techniques further include a method for generating a nominal data exchange model from a data exchange over an inter-processor link during vehicle testing. In an example, the method may monitor, with an anomalous detection and correction module (ADCM), a production data exchange over the inter-processor link between a first processor and a second processor. In an example, the method may analyze, with the ADCM, the production data exchange to the nominal data exchange model. As used herein, the analysis with the ADCM can include a statistical analysis and evaluation of the production data. The method may initiate a correction action in response to an identification that the data exchange over the inter-processor link is anomalous from the nominal data exchange model.

The present techniques also include a non-transitory machine-readable medium for link anomaly detection. In an example, the machine-readable medium does not refer to any signal or transitory media but instead refers to non-transitory medium including for example computer memory or computer storage. In an example, the computer-readable medium may contain instructions that are transferred to a processor by a bus. When executed on the processor, a data exchange model generator may generate a nominal data exchange model from a data exchange over an inter-processor link during vehicle testing. This example may include a production data exchange monitor to monitor, with an anomalous detection and correction module (ADCM), a production data exchange over the inter-processor link between the processor and a second processor. In an example, this example may include a production data exchange analyzer to analyze, with the ADCM, the production data exchange to the nominal data exchange model. When executed on the processor, a correction action initiator may initiate a correction action in response to an identification that the data exchange over the inter-processor link is anomalous from the nominal data exchange model.

BRIEF DESCRIPTION OF THE DRAWINGS

The above-mentioned and other features and advantages of the present disclosure, and the manner of attaining them, may become apparent and be better understood by reference to the following description of one example of the disclosure in conjunction with the accompanying drawings, where.

Figure 1:
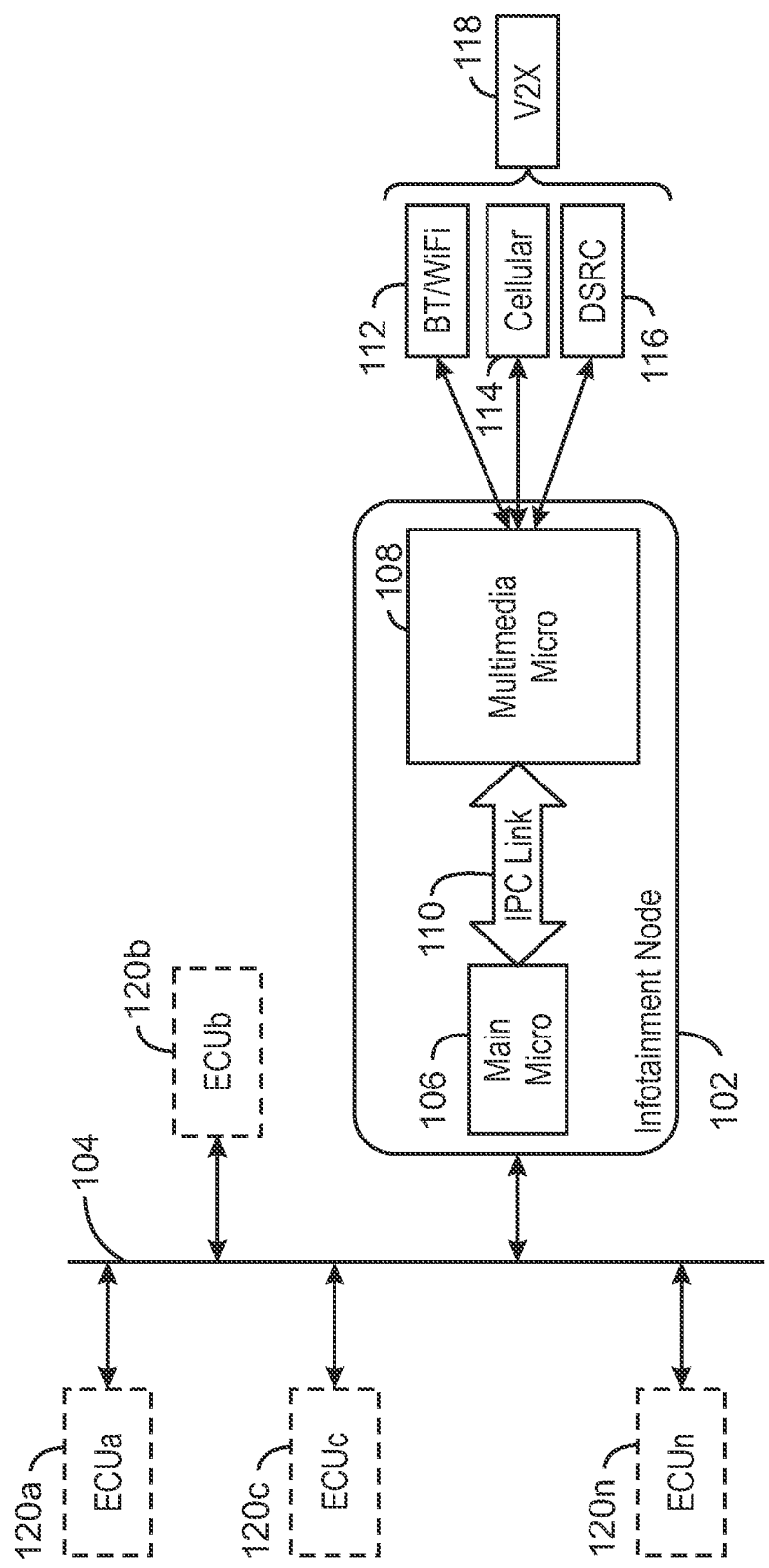
FIG. 1 is a block diagram of an example system for training a link anomaly detector and corrector.

Correlating reference characters indicate correlating parts throughout the several views. The exemplifications set out herein illustrate examples of the disclosure, in one form, and such exemplifications are not to be construed as limiting in any manner the scope of the disclosure.

DETAILED DESCRIPTION OF EXAMPLES

One or more specific examples of the present disclosure are described below. In an effort to provide a concise description of these examples, not all features of an actual implementation are described in the specification. It can be appreciated that in the development of any such actual implementation, as in any engineering or design project, numerous implementation-specific decisions may be made to achieve the developers' specific goals, such as compliance with system-related and business-related constraints, which may vary from one implementation to another. Moreover, it can be appreciated that such a development effort might be complex and time consuming, and is a routine undertaking of design, fabrication, and manufacture for those of ordinary skill having the benefit of this disclosure.

The presently disclosed techniques monitor the IPC link using machine learning and take corrective action in real time on anomalous communication that is detected. Machine learning often relies on models being trained with large datasets. In the present case, the training for IPC communications could be obtained for different use cases during unit testing, integration testing, design validation (DVT) testing, beta testing, fleet testing, field testing, among other types of testing. All this data presents an opportunity to train the presently disclosed machine learning model for use in monitoring the IPC link between microprocessors for a vehicle display or a number of vehicle displays. Use of a model trained prior to deployment provides a safe and reliable baseline for IPC traffic patterns before deployment with the benefit of continued training with data gained after deployment.

In an example, the machine learning model runs on a multimedia microprocessor and detects anomalous communication over the IPC link. In response to this detection, the multimedia processor may prompt for additional verification or provide an alert to a user. In an example, the detection of an anomaly may also trigger the multimedia microprocessor to upload a log, description, detection metrics, a specific configuration, or other relevant information to a remote system such as cloud storage. An anomalous report may be used to identify the anomaly, generate a solution, or provide a record of the conditions and detections for further use in other deployments. In an example, the machine learning model that is analyzing communication over the IPC link can be updated using an over the air (OTA) software (SW) update that may include device or configuration adjustments. The updates may be based on aggregated anomalous reports from an entire fleet sharing the same or similar configuration. In this way, additional improvements may be deployed in light of a small number of anomalous detections.

The present disclosure can increase safety of the connected car by reducing the possibility of a breach into the in-vehicle network through infotainment node. In an example, such as a connected car scenario, an attacker may attempt to gain access to an in-vehicle network to control vehicle remotely. In such a scenario, the infotainment node can be one of the main participants in vehicle to everything (V2X) communication and an IPC link being monitored for anomalies provides increased security for these growing segments.

Compared to attempts to predict and prevent problems, the present technique focuses on attack detection and correction. Attempts to completely predict any issue provide some security coverage, but are not as quickly adaptable to untested deployment scenarios or unexpected information. The use of the present techniques can be used to supplement these techniques to provide additional security to strengthen the detection and correction of issues along the IPC link. As the present techniques enable an adaptable security that provides a way to detect potential security breaches before knowing or predicting the particular variation of the exploit, and as such, IPC link monitoring is able to adapt to unpredicted or unknown attacks where other security measures may fail.

As an example, presently implemented security measures may attempt to prevent spurious communication from reaching an IPC link, by securing attack surfaces such as an unused universal asynchronous receiver-transmitter (UARTS). However, even assuming a high success rate, the present techniques enable protection for cases where this security is insufficient and the IPC link is reached by unauthorized communications, e.g., communications from unauthorized sources. The present techniques can be implemented on systems with or without protection with the assumption that even in presumptively secure systems, the system may at some point be breached despite current security measure, and the proposed techniques provide, in part, a mechanism for the system to take corrective action in the case that a breach does occur.

In an example, an attack on a vehicle may be an external attack such that it approaches through the multi-media processor through a V2X channel. Such an attack represents a remote attack that attempts to gain access to the vehicle through a vulnerability in the processor further removed from the vehicle bus via the interceding main microprocessor. This type of external attack would attempt to propagate through the IPC link from the multimedia microprocessor and towards the main microprocessor over the IPC link. If this external attack reached the main microprocessor over the IPC link, the attack may attempt to spread through the vehicle bus to other components of the vehicle. If the vehicle bus is reached by an external attack then the electronic control units of a component that is attached to the vehicle bus could be compromised.

In an example, an attack on a vehicle may be an internal attack such that it originates with an attack on an ECU that is separated from the infotainment node or main microprocessor by the vehicle bus. In this example, if an ECU is compromised within the vehicle, the attacker would have control and access equal to the ECU that was compromised. Using the compromised component, an internal attack could propagate through a vehicle bus to reach the infotainment node and/or main microprocessor. An internal attack could even move through the main microprocessor to travel over the IPC link to control the multimedia node microprocessor and use this node to propagate to the outside world through the connected V2X channels. Using an internal attack, the infotainment node along with each of the main microprocessor and multimedia microprocessor would be compromised. Further, as the infotainment node may be connected to a synchronizing system, an internal attack could attempt to use the established channels of the multimedia microprocessor to hide malicious attacks to be propagated to other connected vehicles.

FIG. 1 is a block diagram of an example system 100 for training a link anomaly detector and corrector. Lines shown connecting items in these figures generally refer to communicative pathways that enable data to be transferred between the items the line touches. The communicative connections can include wired connections such as traces on a printed circuit board and also include wireless communication through wireless transmission of data from component to component. In some examples, the lines may also indicate an electrical connection sufficient for power to flow through the connection from one component to the other.

An infotainment system of a vehicle can be operated as part of an overall vehicle network architecture. In an example, an infotainment node 102 can be connected to a vehicle bus 104. The vehicle bus 104 may be a controller area network (CAN), local interconnect network (LIN), ethernet connection, or other communication mechanism that communicatively connects an infotainment node 102 to the rest of the system in a vehicle. In an example, the infotainment system may be a node on the vehicle bus 104 and the infotainment node 102 may include two processors. There may be a link between these two distinct processors within a node that are linked directly to one another to enable inter-processor communications. Accordingly, this connecting link may be called an inter-processor communications (IPC) link 110.

When referencing a number of processors together as a node in a vehicle network architecture, one of the processors may be connected to the vehicle network via the vehicle bus 104 such as a controller area network (CAN) bus or ethernet connection. In this example, one of the processors in a node 102 may not be directly connected to the vehicle bus. In an example, a node of processors may include a first processor 106 directly connected to the vehicle bus 104 and a second processor 108 connected to the vehicle bus 104 through a connected and intervening first processor 106. In an example, the infotainment node 102 can be a multi-microprocessor system with a main microprocessor 106 and a multimedia microprocessor 108. The microprocessors communicate with each other over the inter-processor communication (IPC) link 110. A number of hardware interfaces may be used for an IPC link including Universal Asynchronous Receiver/Transmitter (UART), Serial Peripheral Interface (SPI), Peripheral Component Interconnect (PCI), Ethernet. In some examples the processors may be configured to share memory and the link be a representation to show a different processor accessing a shared memory. The present techniques use the monitoring of data traffic over the IPC link 110 during vehicle operation to detect anomalous communication and alert the driver and take corrective action.

In an example, the main microprocessor 106 may manage control of a vehicle with a separate multimedia microprocessor 108 to handle processing for a visual component in a corresponding display and may also handle incoming multimedia connections 112. In an example a display such as an infotainment center, a media display, a heads up display (HUD) or other node with visual components may include more than one processor.

These incoming multimedia connections 112 can include connections through Bluetooth communications where Bluetooth is a registered trademark of BLUETOOTH SIG, INC. a corporation of Delaware. These incoming multimedia connections 112 can include connections through Wi-Fi communications where Wi-Fi is a registered trademark of the Wi-Fi Alliance, a corporation of California.

The incoming and outgoing data to and from the multimedia microprocessor can include cellular communications 114 or other dedicated short range communications (DSRC) 116. The connection of this example processor may connect through more than specific communication protocols. A processor may also include other communications here represented by a vehicle to everything (V2X) connection 118. The V2X 118 field refers to not only specific signals that may be received such as the examples shown, but is also representative of other connections and devices or external signals that a vehicle or vehicle infotainment system may receive or use to communicate.

Along the vehicle bus 104, a number of electronic control units (ECUs) 120a-n, and the infotainment node 102 may be interconnected by the vehicle bus 104. Each of the ECUs may control or affect the way a vehicle operates and there may be a separate node or ECU for each component. In an example, the infotainment node 102 may be connected by the vehicle bus 104 to a first ECUa 120a, which may be an ECU for a particular system of the vehicle or another device connected to the vehicle bus 104. In an example, the vehicle bus 104 may also connect to a second ECU, such as ECUb 120b, a third ECU, such as ECUc 120c, or as many ECUs up to and including ECUn 120n. Each ECU may correspond to a distinct system or distinct function or control that may communicate with the infotainment node 102. In an example, each of the ECUs 120 may communicate with the main microprocessor 106 to receive instructions and provide feedback of data for each ECU.

The present system 100 may provide a training configuration for the link anomaly detector and corrector. In this example system 100, the IPC 110 traffic data can be collected. The collection may take place during product development, fleet testing of vehicles, and other testing situations. In an example, the traffic data collected over this link can be used to generate a model for traffic patterns over an IPC link 110 in controlled circumstances. Once this model is obtained using a system like the example system in FIG. 1, the trained model of traffic patterns over the IPC 110 can be used as reference to monitor the IPC link to detect anomalous communication during vehicle operation when the vehicle is being used in production circumstances. Anomaly detection and correction can be implemented as separate hardware connected to a microprocessor, or may also be implemented as software modules on the microprocessors.

In an example, if anomalous communications are detected, the link anomalous detector and corrector may alert the driver or may take corrective action as the anomalies are detected. Further, while the system in FIG. 1 shows a potential training scenario, further updates may be made. In an example, detected anomalies may be uploaded to maintain a database of anomalies. In an example, the uploads of anomalous detections may be to a cloud storage accessible by other vehicles using similar software, hardware, and configurations. In an example, the collections of anomalous detections may be uploaded to an original equipment manufacturer who manufactured a portion of the infotainment node or maintains a database specifically for hosting and compiling anomalous communication reports from a vehicle, or performs similar activity. Uploaded anomalous detections either singularly or compiled can be used to improve a model as through further evidence of both nominal communications and anomalous communications over the IPC link 110. In an example, the model used in a system 100 or other configurations can be updated with the implementation of an improved model via updates. These updates can be made via manual download, automatic download, wired connection to the internet, from a Wi-Fi connection, from cellular data of a user, or from over the air (OTA) software updates.

Figure 2:
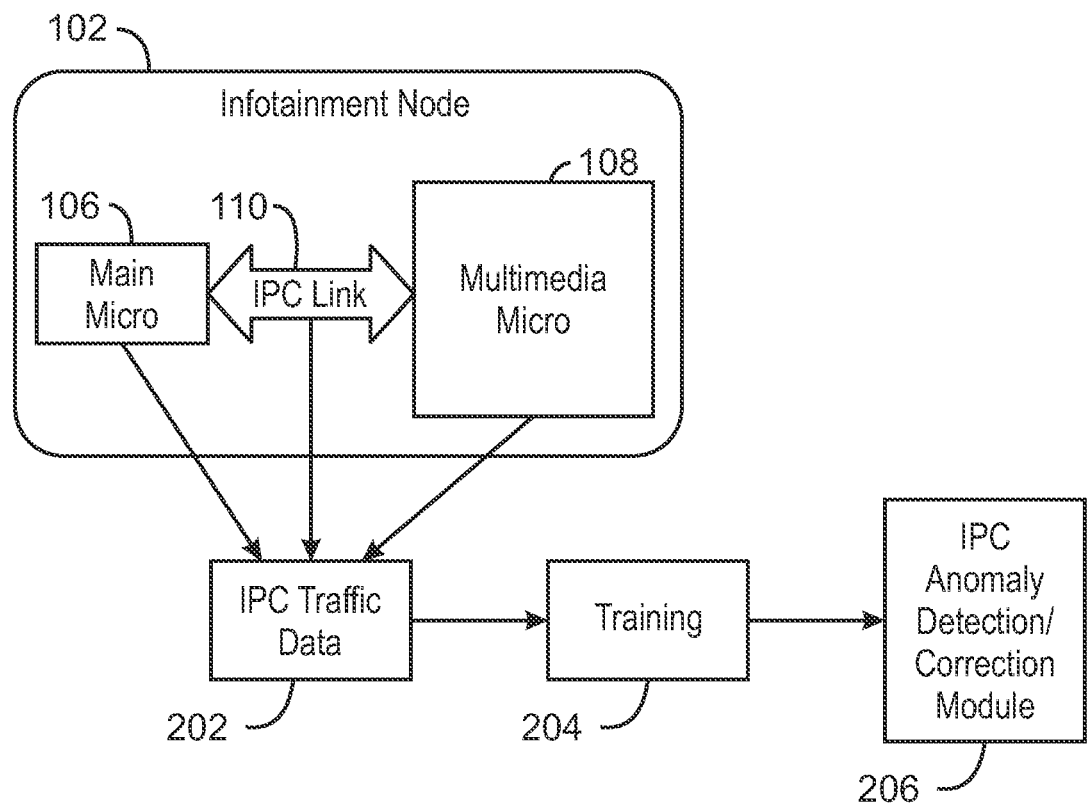
FIG. 2 is a schematic diagram of an example system showing data used in training a link anomaly detector and corrector.

FIG. 2 is a schematic diagram of an example system 200 showing data used in training a link anomaly detector and corrector. Like numbered items are as disclosed with respect to FIG. 1.

Arrows drawn between items indicate a direction of data flow through a communicative channel between the two items connected. These communicative connections may be made by wired or wireless connections.

The model can be a statistical or machine learning model. This model is trained with normal IPC traffic data. Depending on the model generation method used, anomalous traffic from known anomalous activity could be used during model generation. The IPC link 110 may be monitored directly and the IPC traffic patterns 202 identified for use in training 204 the model of IPC traffic in nominal conditions. Once trained, the model can be implemented as a distinct IPC anomaly detection and correction module 206 to detect anomalous traffic on IPC link. The training 204 may use of the IPC traffic data 202 in order to train models such as neural networks, support vector machines, histogram-based models, Markov methods, a combination of models, or other suitable models for anomaly detection. A number of different models may be used to generate the IPC anomaly detection and correction module (ADCM).

Figure 3:
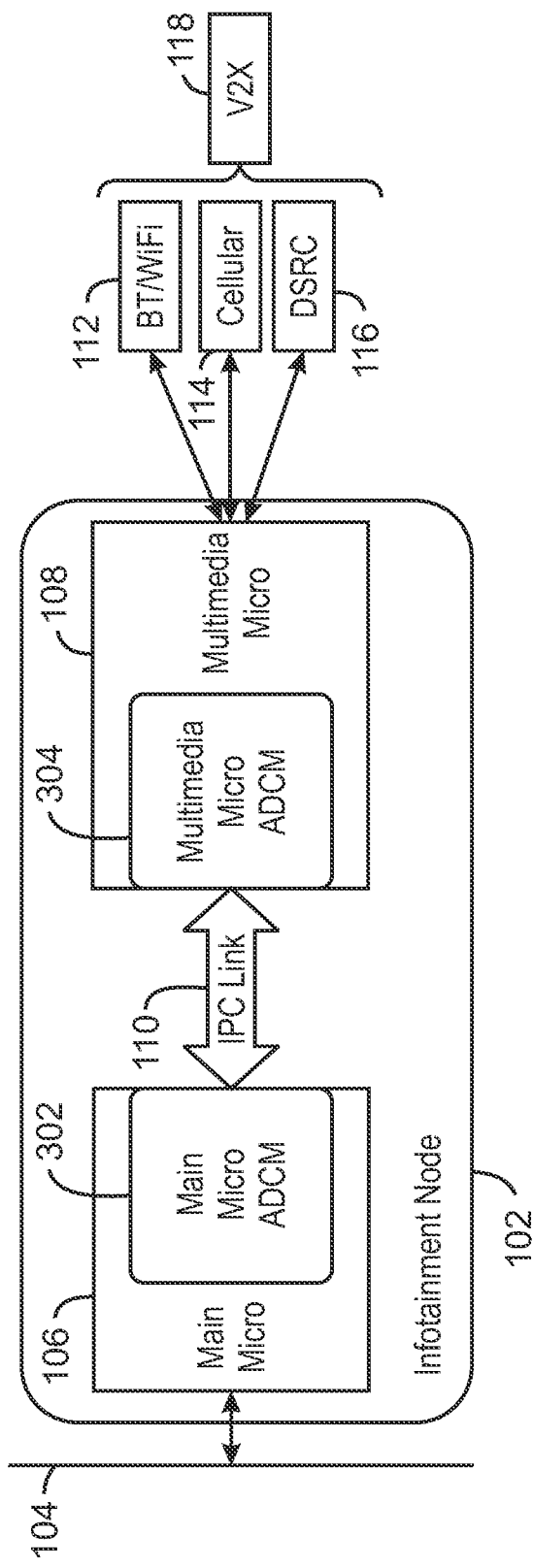
FIG. 3 is a block diagram of an example system for dual microprocessor installation of an anomaly detector and corrector.

FIG. 3 is a block diagram of an example system 300 for dual microprocessor installation of an anomaly detector and corrector. Like numbered items are as disclosed with respect to FIG. 1.

In the example system 300, an ADCM has been implemented with each of the microprocessors in the infotainment node 102. The main microprocessor 106 may include a main microprocessor ADCM 302. The main microprocessor ADCM 302 may monitor traffic passing over the IPC link to detect anomalies in traffic communication. In an example, the main microprocessor ADCM 302 may monitor outgoing traffic from the main microprocessor 106 traveling towards the multimedia microprocessor 108. In an example, the main microprocessor ADCM 302 may monitor incoming traffic arriving at the main microprocessor 106 from the multimedia microprocessor 108. In an example, the main microprocessor ADCM 302 may detect anomalous communications over the IPC link and may alert a user as to the nature of the anomalous communications and action that can be taken. In an example, the main microprocessor ADCM 302 may automatically sever communications to the multimedia microprocessor 108 through the IPC link 110 in response to detections of anomalous communications. In an example, the main microprocessor ADCM 302 may request confirmation of communication authenticity to the multimedia microprocessor 108, which in response may verify authenticity or send an authentication request to the originating source of the communication. In an example, the main microprocessor ADCM 302 may count a frequency of anomalous communications over a period of time and may initiate a restart of the main microprocessor 106 in response to a threshold being exceeded.

In an example, the main microprocessor ADCM 302 may instruct a multimedia microprocessor 108 to sever communication and block communications with the most recently established, active, or added communication channel in response to the anomalous communications being detected over the IPC link 110. In this example, the most recent IPC communications could be monitored after the multimedia microprocessor 108 blocked the most recent communication channel. In this example, if further anomalous communications persist, then the main microprocessor ADCM 302 could instruct the multimedia microprocessor to block the second most recently established communication channel. This process could continue until the anomalous communications were no longer detected. The most recently blocked channel of communications could be identified as the source of anomalous communications and any other previously blocked channels of communications could be resumed with further monitoring of the IPC link 110.

The multimedia microprocessor ADCM 304 may monitor traffic passing over the IPC link 110 to detect anomalies in traffic communication. In an example, the multimedia microprocessor ADCM 304 may monitor incoming traffic from the main microprocessor 106 traveling towards the multimedia microprocessor 108. In an example, the multimedia microprocessor ADCM 304 may monitor outgoing traffic arriving at the main microprocessor 106 from the multimedia microprocessor 108. In an example, the multimedia microprocessor ADCM 304 may detect anomalous communications over the IPC link 110 and may alert a user as to the nature of the anomalous communications and action that can be taken. In an example, the multimedia microprocessor ADCM 304 may automatically sever communications to the main microprocessor 106 through the IPC link 110 in response to detections of anomalous communications. In an example, the multimedia microprocessor ADCM 304 may request confirmation of communication authenticity to the main microprocessor 106, which in response may verify authenticity or send an authentication request to the originating source of the communication. In an example, the multimedia microprocessor ADCM 304 may count a frequency of anomalous communications over a period of time and may initiate a restart of the main microprocessor 106 in response to a threshold being exceeded.

Figure 4:
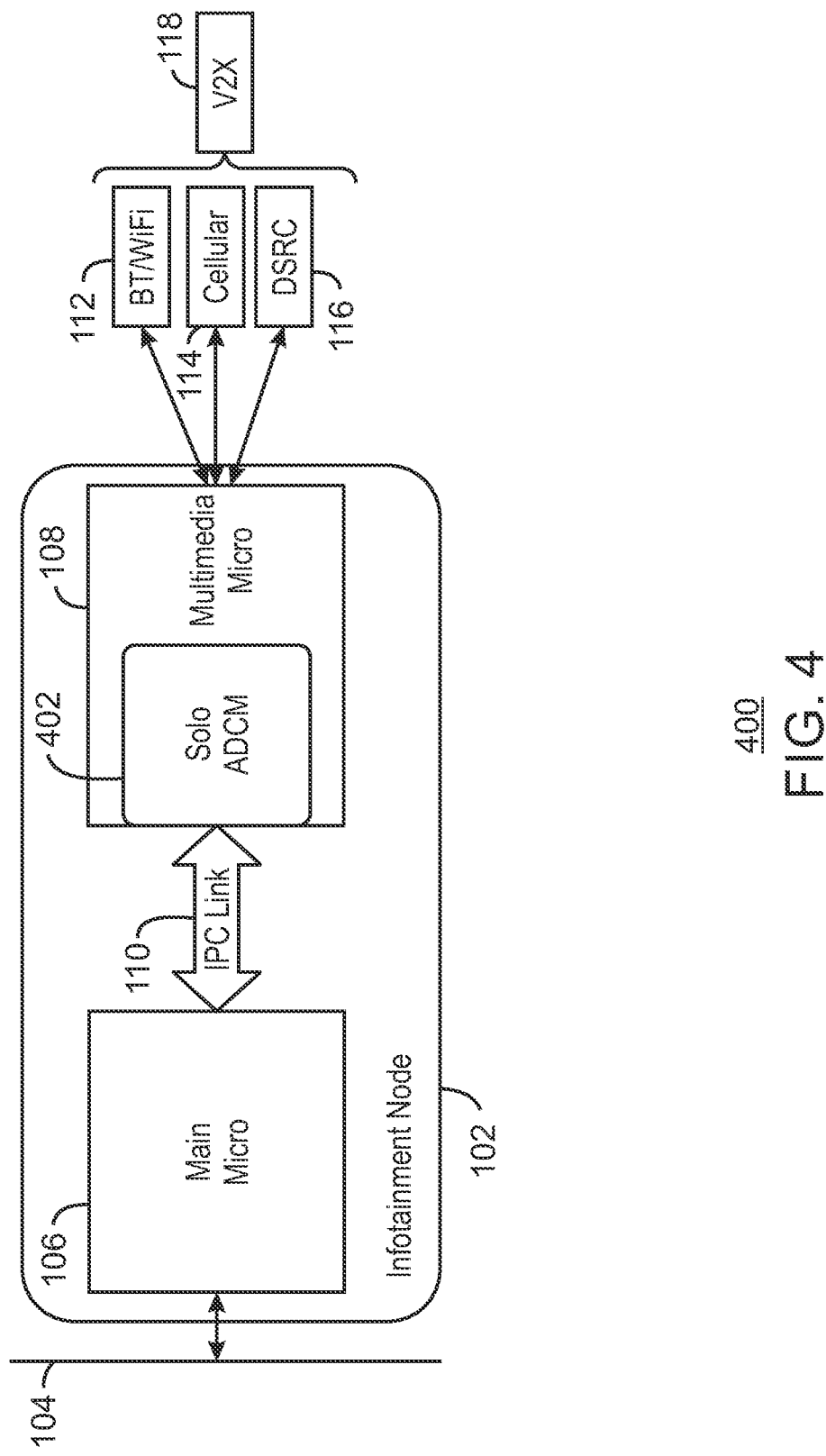
FIG. 4 is a block diagram of an example system for dual microprocessor installation of an anomaly detector and corrector.

FIG. 4 is a block diagram of an example system 400 for dual microprocessor installation of an anomaly detector and corrector. Like numbered items are as described with respect to FIG. 1.

The system 400 may include a solo ADCM 402. In an example, the solo ADCM 402 may be the only ADCM implemented in the infotainment node 102. In an example, the solo ADCM 402 was implemented in the multimedia microprocessor 108 as this is the more powerful microprocessor in this system 400. In an example, the solo ADCM 402 may be implemented in the main microprocessor 106 in cases where the main microprocessor 106 is the more powerful processor. In an example, the more powerful processor may be determined by clock speed of the processor, number of cores of the processor, the ability for the processor to implement multi-threading, the availability of L3 cache of the processor, machine learning processing capability, or a combination of these factors or other factors used in quantitatively identifying processor power.

The solo ADCM 402 may monitor traffic passing over the IPC link 110 to detect anomalies in traffic communication. In an example, the solo ADCM 402 may monitor incoming traffic from the main microprocessor 106 traveling towards the multimedia microprocessor 108. In an example, the solo ADCM 402 may monitor outgoing traffic arriving at the main microprocessor 106 from the multimedia microprocessor 108. In an example, the solo ADCM 402 may detect anomalous communications over the IPC link 110 and may alert a user as to the nature of the anomalous communications and action that can be taken. In an example, the solo ADCM 402 may automatically sever communications to the main microprocessor 106 through the IPC link 110 in response to detections of anomalous communications. In an example, the solo ADCM 402 may request confirmation of communication authenticity to the main microprocessor 106, which in response may verify authenticity or send an authentication request to the originating source of the communication. In an example, the solo ADCM 402 may count a frequency of anomalous communications over a period of time and may initiate a restart of the main microprocessor 106 in response to a threshold being exceeded.

Figure 5A:
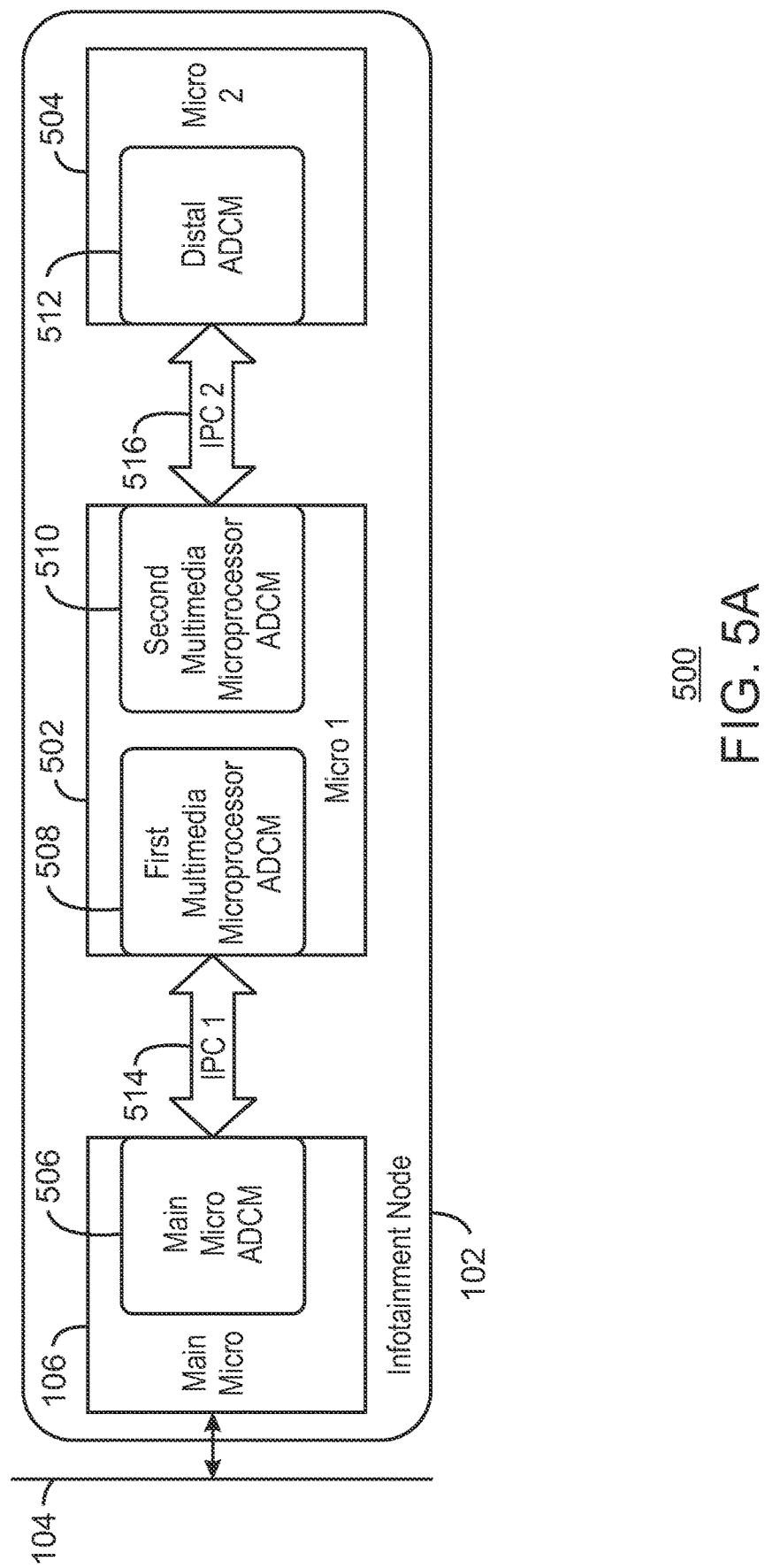
FIGS. 5A and 5B are block diagrams of an example system for multi-link microprocessor installation of an anomaly detector and corrector.

FIG. 5A is a block diagram of an example system 500 for multi-link microprocessor installation of an anomaly detector and corrector. Like numbered items are as described with respect to FIG. 1.

The system 500 enables more than two microprocessors in a an infotainment node 102. In an example, the first microprocessor 502 may be connected to a second microprocessor 504. In an example the main microprocessor 106 may be connected to a vehicle bus 104 and the first microprocessor 502 may be connected to the main microprocessor without a direct connection to the vehicle bus 104. In an example, the second microprocessor may connect to the first microprocessor without direct connection to the vehicle bus 104 or the main microprocessor 106. In an example, the second microprocessor 504 may connect to the main processor 106 through an intervening connection through the first microprocessor 502. In an example, the first microprocessor 502 may be dedicated to multimedia processing, communication with external devices, processing instructions from the main microprocessor or any related processing within the infotainment node 102. In an example, the second microprocessor 504 may be dedicated to multimedia processing, communication with external devices, processing instructions from the main microprocessor or any related processing within the infotainment node 102. In an example of the system 500, each of the microprocessors may have an ADCM or in some embodiments a subset or even only a single ADCM may be used between each of the microprocessors. The example system 500 shows an example where each IPC link has an ADCM on each connection point however other configurations are contemplated.

The main microprocessor 106 may include a main microprocessor ADCM 506, the first microprocessor 502 may include a first multimedia microprocessor ADCM 508 and a second microprocessor ADCM 510, the second microprocessor 504 may include a distal ADCM 512. The main microprocessor 106 and the multimedia microprocessor 108 may be connected by a first IPC link 514. The first microprocessor 108 and the second microprocessor 504 may be connected by a second IPC link 516.

As disclosed above, each of the ADCMs shown may monitor traffic that is passing over the IPC coming from the microprocessor on which the ADCM is located. As disclosed above, each of the ADCMs shown may monitor traffic that is passing over the IPC arriving at the microprocessor on which the ADCM is located. In an example, a microprocessor immediately adjacent to the main microprocessor, in this example microprocessor 1, may have ADCMs that are operational while other ADCMs in the infotainment node 102 are deactivated. In in this example, communications both incoming and outgoing can be stopped with at least one microprocessor as a buffer between the main microprocessor 106 and external communications. In an example, the distal ADCM 512 may be the sole ADCM operating in response to a determination that the second microprocessor is the sole microprocessor that engages in external communications outside of the vehicle bus 104 or the infotainment node. In an example, the distal ADCM 512 may be operational to check all traffic passing from the second microprocessor 504 towards the first microprocessor over the second IPC link 516.

Figure 5B:
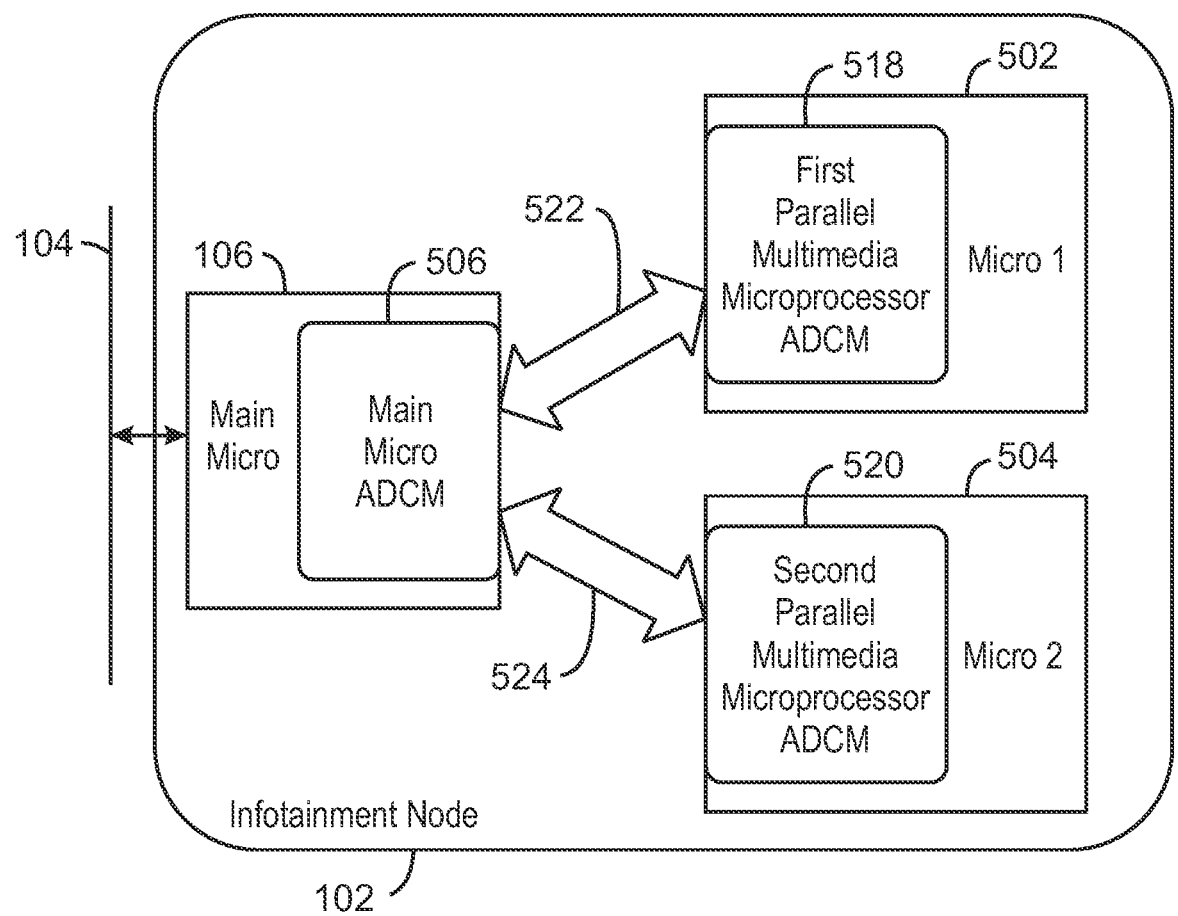

FIG. 5B is a block diagram of an example system 500 for multi-link microprocessor installation of an anomaly detector and corrector in a parallel configuration. Like numbered items are as described with respect to FIG. 1 and FIG. 5A.

In this configuration, the main micro ADCM 506 may be connected to both a first parallel multimedia microprocessor ADCM 518 and a second parallel multimedia microprocessor ADCM 520. The main micro ADCM 506 may be connected to the first parallel multimedia microprocessor ADCM 518 by a parallel IPC link 1 522. Similarly, the main micro ADCM 506 may be connected to the second parallel multimedia microprocessor ADCM 520 by a parallel IPC link 2 524. Each of the ADCMs shown may monitor traffic that is passing over the IPC coming from the microprocessor on which the ADCM is located. As disclosed above, each of the ADCMs shown may monitor traffic that is passing over the IPC arriving at the microprocessor on which the ADCM is located.

Figure 6:
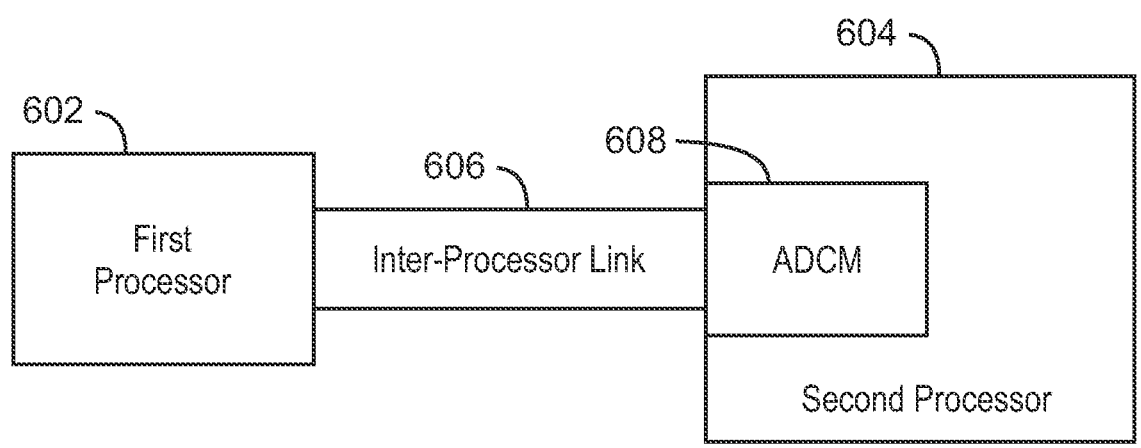
FIG. 6 is a block diagram of an example system a link anomaly detector.

FIG. 6 is a block diagram of an example system 600 a link anomaly detector. The system 600 may be used to implement the method of FIG. 7 or as described in this disclosure. The system 600 may be located in a vehicle and operate for anomalous communication detection. The system 600 may include a first processor 602, a second processor 604, and an inter-processor link 606. In an example the inter-processor link connects the second processor to the first processor.

The system 600 may also include an anomalous detector and corrector module (ADCM) 608 located on at least one of the first processor 602 and the second processor 604. In an example, the ADCM 608 includes a trained model of nominal data exchange over the inter-processor link. In this example, the ADCM 608 identifies that data exchange over the inter-processor link is anomalous in response to the ADCM 608 analyzing the data exchange over the inter-processor link to the trained model of nominal data exchange over the inter-processor link. In an example the ADCM 608 is located on the more powerful processor between the first and the second processor, and the ADCM 608 monitors data exchange both outgoing and incoming over the inter-processor link to the more powerful processor.

In an example, the ADCM 608 is to monitor a data exchange over the inter-processor link 606 and initiate a correction action in response to an identification that the data exchange over the inter-processor link is anomalous. In an example, the correction action is a notification to a user of an anomalous communication. The correction action may be to block communications arriving from sources that are not connected to a vehicle bus in order to block communication coming from unauthorized sources. In an example, the correction action is an instruction to block a most recently added channel of communication from a source not connected to a vehicle bus to the first processor or the second processor.

In an example, the system 600 may include a second ADCM 608, wherein the ADCM 608 is located on the first processor 602 and the second ADCM is located on the second processor 604 and both the ADCM and the second ADCM monitor the inter-processor link 606. The system 600 may also include a third processor, a second inter-processor link between the third processor and the second processor, and a third ADCM located on the third processor to monitor the data exchange of the second inter-processor link. In an example, the system may also include n number of ADCM and m number of processors connected in this manner. In an example, the system 600 may also include a vehicle bus, wherein the first processor 602 is communicatively connected to the vehicle bus, and the second processor 604 is communicatively connected to the vehicle bus solely through an interceding connection to the first processor 602.

Figure 7:
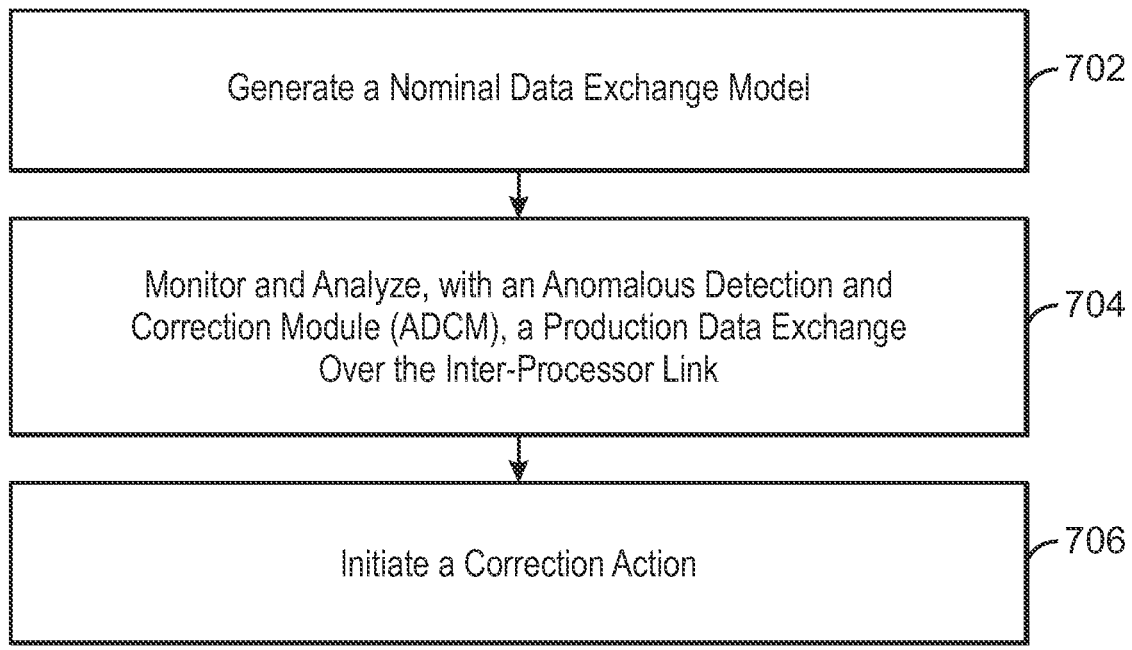
FIG. 7 is a process flow diagram of an example method for link anomaly detection.

FIG. 7 is a process flow diagram of an example method 700 for link anomaly detection. The method 700 can be implemented on a number of systems and devices including those shown in FIGS. 1-6 and 8.

The method 700 may start at block 702. At block 702, the method 700 may generate a nominal data exchange model from a data exchange over an inter-processor link during vehicle testing. At block 702, the method 700 may monitor, with an anomalous detection and correction module (ADCM), a production data exchange over the inter-processor link between a first processor and a second processor.

At block 704, the method 700 may monitor and analyze, with the ADCM, the production data exchange to the nominal data exchange model. As used herein, the analysis with the ADCM can include a statistical analysis and evaluation of the production data. In an example, the ADCM is located on the more powerful processor between the first and the second processor, and the ADCM to monitor data exchange both outgoing and incoming over the inter-processor link to the more powerful processor. The ADCM may be located on the first processor and a second ADCM is located on the second processor and both the ADCM and the second ADCM monitor the first inter-processor link.

At block 706, the method 700 may initiate a correction action in response to an identification that the data exchange over the inter-processor link is anomalous from the nominal data exchange model. In an example, the correction action is a notification to a user of an anomalous communication. The correction action may block communications arriving from sources that are not connected to a vehicle bus. In an example, the correction action is an instruction to block a most recently added channel of communication from a source not connected to a vehicle bus to the first processor or the second processor. In an example, the anomaly detection can run on both microprocessors or only on the more powerful microprocessor of the two. In an example, when detecting anomalous communication over the IPC, the user, such as a driver, may be alerted through audio visual interfaces or take corrective action when possible. In an example, the IPC link may be encrypted or unencrypted.

In an example, the infotainment system includes more than two microprocessors, and the present techniques can be applied to each pair of microprocessors included. The present techniques can protect from attempts to breach into vehicle bus through multimedia processor and vehicle to everything (V2X) channels. The present techniques can protect from attempts to breach into multimedia processor and V2X channels through vehicle bus. In an example, one version of an attack attempt could disrupt vehicle operation. Another example of an attack could disrupt infotainment node. In this example, an attack could affect V2X communication and thereby impact the safety of other vehicles.

Figure 8:
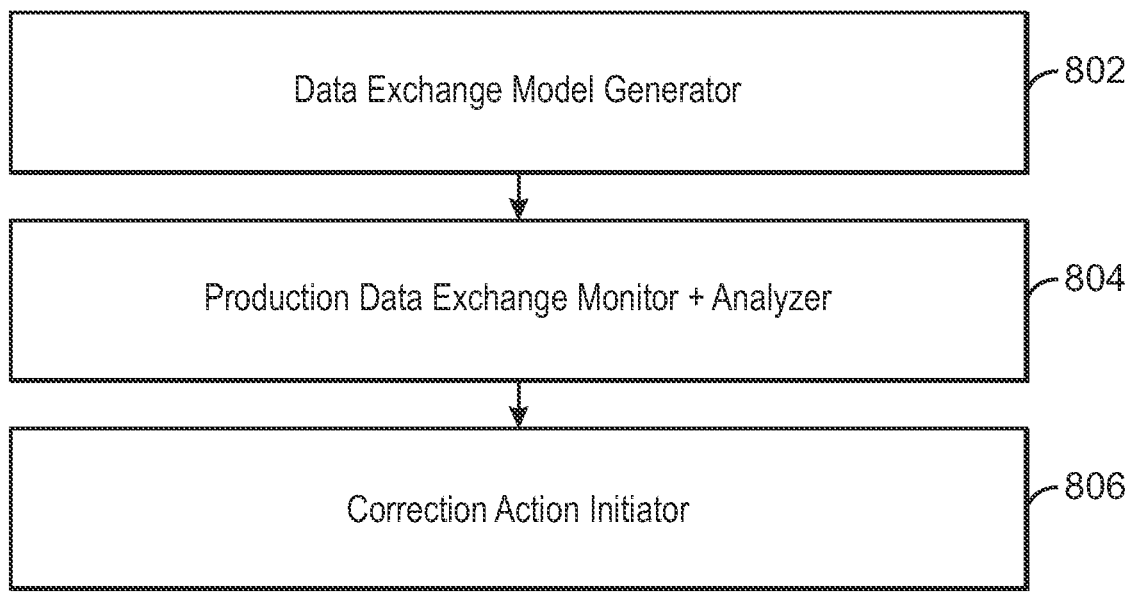
FIG. 8 is a block diagram of components in an example machine-readable medium for link anomaly detection.

FIG. 8 is a block diagram of components in an example machine-readable medium 800 for link anomaly detection. The machine-readable medium does not refer to any signal or transitory media but instead refers to non-transitory medium including for example computer memory or computer storage.

The computer-readable medium may contain instructions that are transferred to a processor by a bus. When executed on the processor, a data exchange model generator 802 may generate a nominal data exchange model from a data exchange over an inter-processor link during vehicle testing.

When executed on the processor, a production data exchange monitor 804 may monitor and analyze, with an anomalous detection and correction module (ADCM), a production data exchange over the inter-processor link between the processor and a second processor. The production data exchange analyzer may analyze, with the ADCM, the production data exchange to the nominal data exchange model. As used herein, the analysis with the ADCM can include a statistical analysis and evaluation of the production data.

When executed on the processor, a correction action initiator 806 may initiate a correction action in response to an identification that the data exchange over the inter-processor link is anomalous from the nominal data exchange model. In an example, the correction action may be a notification to a user of an anomalous communication. The correction action may block communications arriving from sources that are not connected to a vehicle bus. The correction action may be an instruction to block a most recently added channel of communication from a source not connected to a vehicle bus to the processor or the second processor.

What is claimed is:

1. A system for anomalous communication detection, comprising:
   a first processor;
   a second processor;
   an inter-processor link to connect the second processor to the first processor; and
   an anomalous detector and corrector module (ADCM) located on at least one of the first processor and the second processor, the ADCM to monitor a data exchange over the inter-processor link and initiate a correction action in response to an identification that the data exchange over the inter-processor link is anomalous when analyzed against a trained model, wherein the ADCM is located on a more powerful processor between the first and the second processor, and the ADCM monitors data exchange both outgoing and incoming over the inter-processor link to the more powerful processor.

2. The system of claim 1, wherein the ADCM comprises a trained model of nominal data exchange over the inter-processor link.

3. The system of claim 2, wherein the ADCM identifies that data exchange over the inter-processor link is anomalous in response to the ADCM analyzing the data exchange over the inter-processor link against the trained model of nominal data exchange over the inter-processor link.

4. The system of claim 1, comprising a second ADCM, wherein the ADCM is located on the first processor and the second ADCM is located on the second processor and both the ADCM and the second ADCM monitor the inter-processor link.

5. The system of claim 4, comprising:
   a third processor;
   a second inter-processor link between the third processor and the second processor; and
   a third ADCM located on the third processor to monitor the data exchange of the second inter-processor link.

6. The system of claim 1, comprising a vehicle bus, wherein the first processor is communicatively connected to the vehicle bus, and the second processor is communicatively connected to the vehicle bus solely through an interceding connection to the first processor.

7. The system of claim 1, wherein the correction action is a notification to a user of an anomalous communication.

8. The system of claim 1, wherein the correction action is to block communications arriving from sources that are not connected to a vehicle bus in order to block communication coming from unauthorized sources.

9. The system of claim 1, wherein the correction action is an instruction to block a most recently added channel of communication from a source not connected to a vehicle bus to the first processor or the second processor.

10. A method for anomalous communication detection, comprising:
    generating a nominal data exchange model from a data exchange over an inter-processor link during vehicle testing;
    monitoring, with an anomalous detection and correction module (ADCM), a production data exchange over the inter-processor link between a first processor and a second processor, wherein the ADCM is located on a more powerful processor between the first and the second processor, and the ADCM to monitor data exchange both outgoing and incoming over the inter-processor link to the more powerful processor;

analyzing, with the ADCM, the production data exchange to the nominal data exchange model; and initiating a correction action in response to an identification that the data exchange over the inter-processor link is anomalous from the nominal data exchange model.

11. The method of claim 10, wherein the ADCM is located on the first processor and a second ADCM is located on the second processor and both the ADCM and the second ADCM monitor the first inter-processor link.

12. The method of claim 10, wherein the correction action is a notification to a user of an anomalous communication.

13. The method of claim 10, wherein the correction action is to block communications arriving from sources that are not connected to a vehicle bus in order to block communication coming from unauthorized sources.

14. The method of claim 10, wherein the correction action is an instruction to block a most recently added channel of communication from a source not connected to a vehicle bus to the first processor or the second processor.

15. A non-transitory computer-readable medium containing instructions that when executed on a processor, cause the processor to:

generate a nominal data exchange model from a data exchange over an inter-processor link during vehicle testing;

monitor, with an anomalous detection and correction module (ADCM), a production data exchange over the inter-processor link between the processor and a second processor, wherein the ADCM is located on a more powerful processor between the first and the second processor, and the ADCM to monitor data exchange both outgoing and incoming over the inter-processor link to the more powerful processor;

analyze, with the ADCM, the production data exchange to the nominal data exchange model; and initiate a correction action in response to an identification that the data exchange over the inter-processor link is anomalous from the nominal data exchange model.

16. The computer-readable medium of claim 15, wherein the correction action is a notification to a user of an anomalous communication.

17. The computer-readable medium of claim 15, wherein the correction action is to block communications arriving from sources that are not connected to a vehicle bus in order to block communication coming from unauthorized sources.

18. The computer-readable medium of claim 15, wherein the correction action is an instruction to block a most recently added channel of communication from a source not connected to a vehicle bus to the processor or the second processor.

* * * * *